United States Patent [19]

Vukovich, Jr.

[11] Patent Number: 4,978,295
[45] Date of Patent: Dec. 18, 1990

[54] KILN WITH VENTILATION SYSTEM

[75] Inventor: Milan Vukovich, Jr., Galena, Ohio

[73] Assignee: Edward Orton Jr., Ceramic Foundation, Westerville, Ohio

[21] Appl. No.: 343,735

[22] Filed: Apr. 25, 1989

Related U.S. Application Data

[63] Continuation of Ser. No. 185,366, Apr. 21, 1988, Pat. No. 4,863,374, which is a continuation of Ser. No. 30,584, Mar. 27, 1987, abandoned.

[51] Int. Cl.$^5$ .............................................. F27B 5/00
[52] U.S. Cl. ..................................... 432/120; 219/391; 219/400
[58] Field of Search ............... 219/390, 391, 400, 405, 219/408; 373/8, 9; 126/21 A, 21 R; 432/120, 121

[56] References Cited

U.S. PATENT DOCUMENTS

| | | | |
|---|---|---|---|
| 4,531,910 | 7/1985 | Geil | 432/120 |
| 4,646,315 | 2/1987 | Hixenbaugh et al. | 373/9 |
| 4,719,333 | 1/1988 | White | 219/400 |

Primary Examiner—Henry A. Bennet
Assistant Examiner—Christopher B. Kimer
Attorney, Agent, or Firm—Banner, Birch, McKie & Beckett

[57] ABSTRACT

An electrically heated kiln having a ventilation system in accordance with the present invention includes a hinged upper wall, a lower wall, and side walls forming a firing chamber. The kiln further includes an upper ventilation aperture formed in the upper wall and a lower ventilation aperture formed in the lower wall. A duct connects the lower aperture with the outside environment. An exhaust fan, coupled to the duct, draws incoming air into the kiln through the upper aperture, downwardly through the kiln, and outwardly through the lower aperture into the duct to be expelled outside. The downward movement of the air and kiln gases causes turbulence near the upper portion of the kiln to create a more uniform temperature within the kiln. The apertures are sized and the draw rate is selected so as to provide proper ventilation of the kiln. The draw rate is preferably between 8% and 45% of the kiln volume per minute when measured at room temperature through the lower aperture. Both the upper and lower apertures may be formed of a plurality of openings.

13 Claims, 2 Drawing Sheets

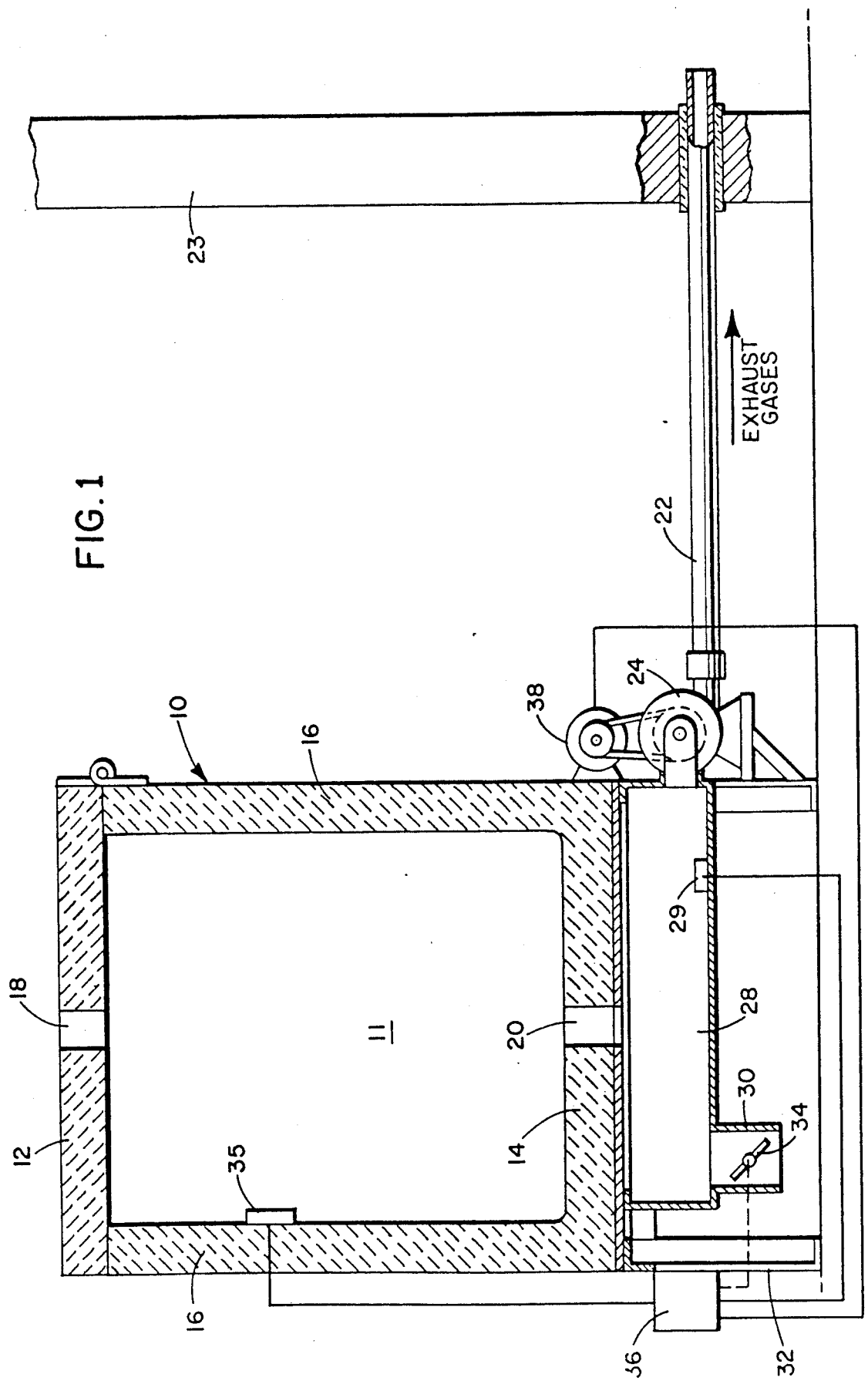

KILN WITH VENTILATION SYSTEM

This application is a continuation, of application Ser. No. 185,366, filed Apr. 21, 1988 now U.S. Pat. No. 4,863,374 which is a continuation of Ser. No. 030,584, filed March 27, 1987 (now abandoned).

BACKGROUND OF THE INVENTION

The present invention is directed to an improved electrically heated ceramic kiln, and more particularly, to a ventilation system for an electrically heated ceramic kiln.

As is well recognized in the art, when firing an electrically heated ceramic kiln, it is necessary to provide adequate ventilation of the interior of the kiln to permit oxidation of the organic material normally present in glazes, bodies, and decorations when the wares are being fired. In addition, ventilation is also needed to remove $CO_2$, $H_2O$ and other gases that are released from many of the materials during the firing process. If ventilation is inadequate, physical defects in the wares and glazes usually result. Many colors are also permanently and adversely altered by inadequate ventilation.

Electrically heated ceramic hobby kilns are typically ventilated by removing peep hole plugs which open apertures formed in the top or side walls of the kiln, and by opening lids or doors during the early stages of firing. At some point, the doors or lids are closed and one or two peep holes are left open to ventilate the kiln. When ventilation is provided in this manner, the fumes and gases that are produced in the kiln are discharged into the workroom surrounding the kiln. Because these gases may be unpleasant, and may even contain toxic components such as carbon monoxide from incomplete oxidation, ventilation of the workroom is required. In addition, because ventilation of the kiln is dependent upon natural drafts created by the heating of air within the kiln, the rising hot air and incoming cooler room air causes the kiln to be cooler at the bottom and hotter at the top.

More complex ventilation systems are typically used in commercial kilns. For example, in U.S. Pat. No. 4,291,471 issued to Bloom, a ventilation system is disclosed for venting the pre-heat section of a tunnel kiln. Bloom discloses a kiln having a longitudinal duct and an input tube. Compressed air passes through the input tube and is expelled laterally and vertically to create a turbulent air flow laterally across the pre-heat section of the kiln. This air, which mixes with the contaminated kiln gases, is captured by cones disposed about apertures in the longitudinal duct on the other side of the pre-heat section, and is drawn into the duct. A blower, attached to one end of the duct, vents air from the duct thereby creating a partial vacuum in the duct which draws the contaminant laden air into the duct through the cones. Air curtains prevent outside atmosphere from entering the pre-heat section at either the entrance or the exit. Such a ventilation system, however, does not create downdraft turbulence and suffers from the same lack of temperature uniformity present in the naturally ventilated kilns described above.

SUMMARY OF THE INVENTION

It is an object of the present invention to provide an electrically heated kiln with a ventilation system which improves the temperature uniformity of the kiln.

It is a further object of the present invention to provide ventilation for an electrically heated kiln without venting noxious kiln gases into the workroom environment.

It is a further object of the present invention to provide an electrically heated kiln ventilation system that is easy and convenient to use for a hobby kiln.

The present invention is directed to a ceramic kiln having a ventilation system which provides uniformity of temperature in the firing chamber of the kiln, while safely ventilating gases produced during the firing process. The firing chamber of the kiln is formed by a hinged or removable upper wall, a lower wall and a continuous side wall. An upper ventilation aperture is formed in the upper wall, through which incoming air may be drawn into the kiln and a lower ventilation aperture is formed in the lower wall through which kiln gases may be expelled. The area of the lower aperture is approximately equal to, or less than, the area of the upper aperture plus the area of any other openings in the side wall of the kiln that have been provided for other purposes, e.g., as peep holes or to accomodate heating element lead wires and thermocouples, and have not been completely resealed, so that the amount of air withdrawn at the bottom of the kiln can be properly controlled to achieve proper ventilation of the kiln. Both the upper aperture and the lower aperture may be formed of a plurality of openings. Additionally, a duct is coupled between the lower aperture and the outside environment to vent kiln gases outside of the workroom. An exhaust fan or blower is coupled to the duct to draw air into and downwardly through the kiln and outwardly through the lower aperture into the duct. The downward movement of the air and kiln gases causes turbulence in the kiln, mixing the cooler incoming air with the rising hotter air to create a more uniform temperature within the kiln.

Further enhancements may be included in the kiln ventilation system. For example, the air withdrawn at the bottom of the kiln may be passed through a heat exchanger or mixed with air from the workroom so that the air temperature handled by the duct is maintained below the temperature limits of materials used in the duct or blower. Additionally, the duct may be formed of a double-walled tube so that the kiln gases are vented outwardly through the inner tube and outside air is drawn inwardly through the outside tube to compensate for the air discharged from the room. Dampers and/or motor controls may also be used to regulate the air flow during the firing process should it be desired to proportion the airflow to the needs of the materials being fired. A temperature control device such as that described in U.S. Pat. No. 4,461,616, incorporated herein by reference, may be programmed to control the operation of the exhaust fan motor and/or damper while it is measuring the temperature within the furnace. Thus, temperature measuring and control devices could be used to control and monitor the kiln venting system.

BRIEF DESCRIPTION OF THE DRAWINGS

FIG. 1 is a vertical sectional view of a ceramic kiln incorporating a ventilation system in accordance with a first embodiment of the present invention;

DETAILED DESCRIPTION OF THE PREFERRED EMBODIMENT

Figure 2A:
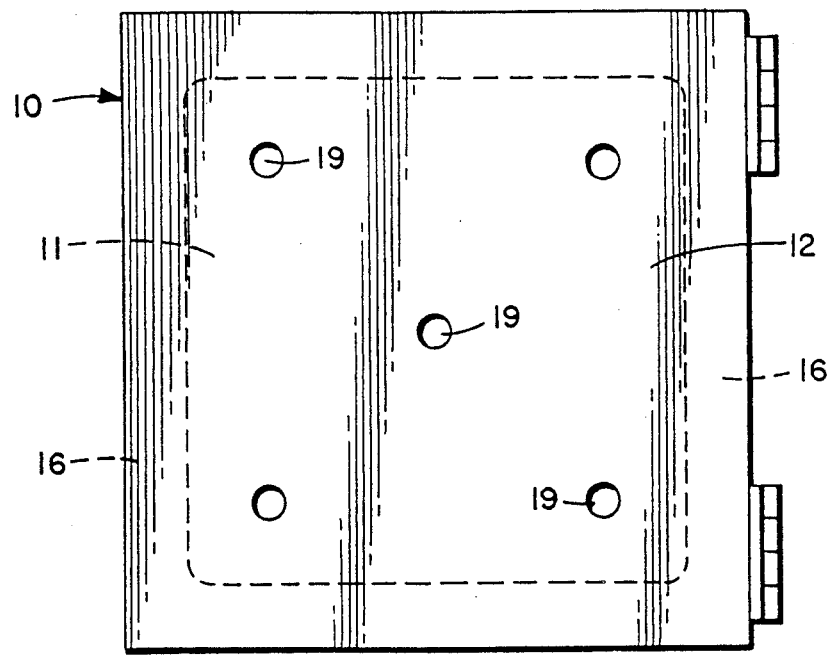
FIG. 2A is a top plan view of the ceramic kiln in accordance with a second embodiment of the present invention.

A kiln with a ventilation system in accordance with the present invention is illustrated in FIG. 1 and generally designated 10. Kiln 10 includes hinged and/or removable upper wall 12, lower wall 14, and side walls 16, forming a firing chamber 11 within which an article may be fired. Kiln 10 is preferably of the top-loading, electric, ceramic hobby kiln type, however, it is understood that a ventilation system in accordance with the present invention may be used with other types of kilns as well, such as a front-loading kiln.

Figure 2B:
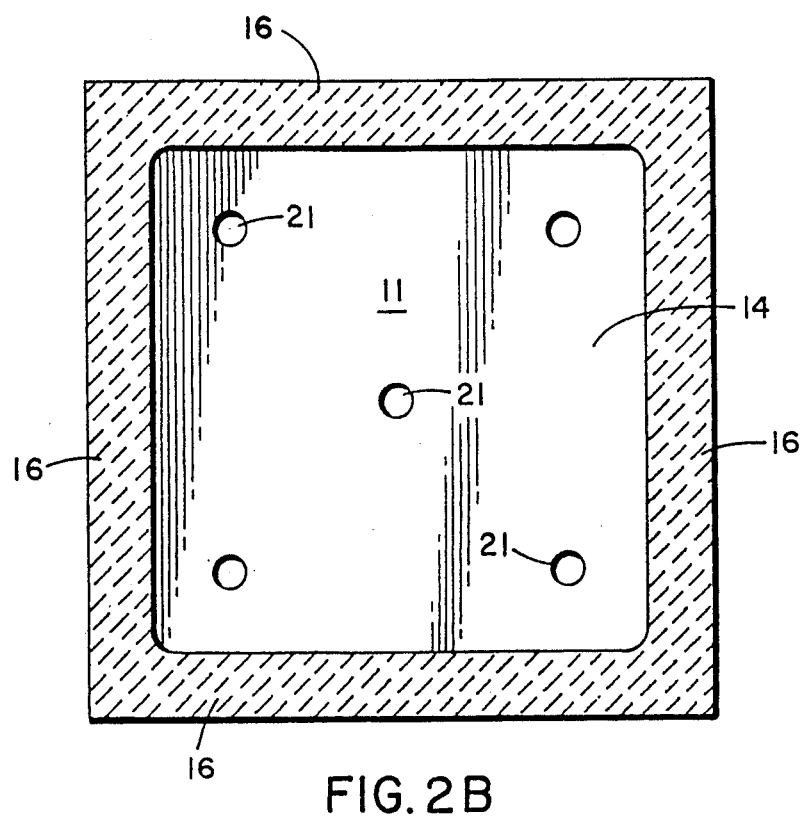
FIG. 2B is a plan view of the bottom of the ceramic kiln in accordance with a second embodiment of the present invention.

The ventilation system includes an upper ventilation aperture 18 formed in upper wall 12 through which incoming air may be drawn into the kiln and a lower ventilation aperture 20 formed in lower wall 14 through which kiln gases may be expelled. Incoming air may also be drawn into the kiln through apertures (not shown) formed in side walls 16 for other purposes, e.g., to serve as peep holes, to accomodate element lead wires or thermocouples, which cannot be totally sealed. The area of the lower aperature is approximately equal to, or less than, than the area of the upper aperture, plus the area of any aperture formed in the side wall so that the lower aperture controls the amount of gases withdrawn from the kiln. Additionally, in a second preferred embodiment illustrated in FIGS. 2A and 2B, upper aperture 18 and lower aperture 20 are formed of a plurality of openings 19, 21, respectively, to promote better mixing of the air within the kiln. The pattern of apertures in the upper and lower walls is appropriately designed so that the ventilation is even and complete throughout the kiln. The total area of lower openings 21 is approximately equal to or less than, the total area of upper openings 19. As will be further explained below, the size of the openings and the rate at which the air is drawn through the kiln are important factors in providing proper ventilation for the kiln.

Duct 22 couples the lower aperture to the outside environment to allow the kiln gases to be vented outside of the workroom through the wall 23. Exhaust fan or blower 24 is coupled to duct 22 to draw air into and downwardly through the kiln and outwardly through the lower aperture into the duct. Fan 24 is driven by any suitable means, such as motor 38. The downward movement of the air and kiln gases causes turbulence near the upper portion of the kiln which mixes the incoming cooler air with the rising hot air to create a more uniform temperature within the kiln. Exhaust fan 24 removes between 8% and 45% of the kiln volume per minute at room temperature, with 33% having been found optimum for some materials.

The amount of air withdrawn from the kiln can be limited by the size of the apertures in the lower kiln wall, and/or the size of the apertures in the upper kiln wall in the side wall or by suitably controlling the operational speed of the exhaust fan. Controlling the amount of air which is withdrawn at the bottom of the kiln, through aperture size and draw rate selection, provides the proper ventilation of the kiln. If too much air is taken through the kiln, it wastes energy and reduces the maximum temperature to which the kiln may be heated. If too little air is drawn through the kiln the article may not be properly oxidized. Additionally, if the apertures in the upper wall or side wall are too numerous or too large, kiln gases may escape into the room.

An example of a kiln and ventilation system in accordance with the present invention consists of a Model TX23 Cress Kiln manufactured by the Cress Manufacturing Co., South El Monte, Calif. 91733. An aperture measuring 0.049 square inches is drilled through the lid at its center and another aperture of the same size is drilled directly below that hole through the bottom of the kiln. A plenum measuring 1½" deep and 10×10 inches square is positioned at the bottom of the kiln. The upper part of the plenum had a 4" diameter aperture and four 1 inch diameter apertures are formed in each of 4 sides of the plenum. A blower that moved 83 cu. ft. per min. at 0.0 inches static pressure decreasing to 73 cu. ft. per minute at 0.4 inches static pressure is installed on the bottom of the plenum. Air from the plenum is discharged by the blower through 30 feet of 4 inch flexible aluminum tubing. When 13 pounds of greenware is fired, distributed on three shelves, improved kiln uniformity is obtained in that all three shelves show that the same pyrometric cone number has deformed on each shelf. The bisqueware also shows complete burnout and red glazed bisque pieces fired alongside the greenware are fired to a bright red color. The kiln measures 3.3 cu. ft. and total air flow from the bottom of the kiln is between 0.6 and 1.1 cu. ft. per min. or between 18 and 34% of the kiln volume when measured at room temperature.

As shown in FIG. 1, plenum 28 connects lower aperture 18 with duct 22. However, it is understood that duct 22 and exhaust fan 24 may be connected directly with lower aperature 18, if desired, and plenum 28 could then be eliminated. Plenum 28 has room air inlet 30 with damper 34 which allows the outgoing kiln gases to be mixed with room air to cool the gases to a temperature which will not harm the materials used in the exhaust system and will also not harm the operator should the operator contact the exhaust system. A heat sensing device 29 is positioned in plenum 28 and connected to microcomputer temperature control device 36 to control damper 34 and provide the amount of room air needed. Of course, the heat sensing device may be located elsewhere in the exhaust system, if desired. Alternatively, the outgoing kiln gases may be passed through a conventional heat exchanger (not shown) to maintain the gas temperature below the temperature limits of the materials used in the duct.

If apertures 18 and 20, and inlet 30 are properly selected, it is possible to eliminate any need for damper 34. As explained below, by suitably controlling the relationship between the size of inlet 30 and the smaller of aperture 18 or 20 combined with the area of any unsealed apertures resulting from openings provided for peep holes, heating element leads, or temperature tranducer leads, air drawn through the kiln for a particular fan and mixed with air from the workroom is limited, thus also limiting the peak temperature of the gases discharged while obtaining sufficient air flow through the kiln for oxidation of the wares being fired. When the area of aperture 18 plus the area of unsealed sidewall openings is less than the area of the aperture 20, aperture 18 and the sidewall openings will limit the amount of air entering the kiln and in turn limit the amount of air leaving the kiln. When the area of aperture 20 is less than the area of the aperture 18 and sidewall openings, aperture 20 will limit the air leaving the kiln and thus directly also limit the air drawn into the kiln.

Duct 22 may be formed of a conventional double walled tube (not shown) in which the kiln gases may be exhausted outwardly through the inner tube and through which outdoor air may flow inwardly into the room through the outer tube to replace the air discharged from the room through the kiln. Conventional insulation techniques may be employed where the duct extends through the wall. The kiln is provided with a stand 32 to support the kiln above the floor.

A temperature control device, as disclosed in U.S. Pat. No. 4,461,616, may be used to regulate the air flow during the firing process should it be desired to proportion the air flow to the needs of the materials being fired. Microcomputer temperature control device 36 may be programmed to provide control of the operation of the exhaust fan motor 38 and damper 34 while it is measuring the temperature within the furnace and in the plenum so as to control and monitor the operation of the kiln venting system. Temperature transducer 35 is located within firing chamber 11 and sends information to microcomputer 36 which, along with the information from heat sensing device 29, controls damper 34 and/or motor 38.

The foregoing is for illustrative purposes only. It is contemplated, that the device may be modified, particularly with regard to size, shape, and arrangement of parts, within the scope of the invention as determined by the broad, general terms in which the appended claims are expressed. For example it is contemplated that upper aperture 18 may be formed of openings in the upper portions of side walls 16.

I claim:

1. An electrically heated kiln having a ventilation system for oxidizing ceramic objects being fired in the interior of the kiln and for safely ventilating kiln gases produced during the firing process while providing greater uniformity in temperature inside the kiln, said kiln comprising:
    an upper wall, a lower wall and side walls forming a substantially fully enclosed firing chamber in which ceramic objects are placed;
    at least one upper ventilation aperture means formed in the upper portion of said firing chamber through which incoming air may be drawn into the firing chamber;
    at least one lower ventilation aperture means formed in the lower portion of said firing chamber;
    a duct coupled between said lower ventilation aperture means and the outside environment; and
    an exhaust fan means coupled to said duct for placing the firing chamber under negative pressure so that kiln gases produced within the kiln are prevented from escaping from said firing chamber through said upper aperture means into the room where the kiln is located, said fan means drawing air into said firing chamber through said upper aperture means and drawing air and kiln gases downwardly through said firing chamber and outwardly through said lower ventilation aperture means into said duct, the downward movement of the air and kiln gases causing turbulence near the upper portion of said firing chamber to create a more uniform temperature within said firing chamber;
    said upper and lower aperture means being sized and the draw rate of said exhaust fan means being selected to limit the amount of air withdrawn at the bottom of the kiln so that less than 100% of the kiln volume is removed per minute when the kiln is operated at room temperature.

2. A kiln having a ventilation system as in claim 1 wherein said upper and lower ventilation aperture means are sized and the draw rate of said exhaust fan is selected to remove between 8% and 45% of the kiln volume per minute when operated at room temperature.

3. A kiln having a ventilation system as in claim 1 further comprising a heat exchanger coupled between said lower ventilation aperture means and said duct to keep the temperature of the kiln gases within the temperature limits of the materials from which said duct is formed.

4. A kiln having a ventilation system as in claim 1 wherein said duct comprises a double walled tube having an inner and outer conduit, the kiln gases being conducted outwardly through the inner conduit and outdoor air being permitted to flow into the room through the outer conduit thus replacing the air discharged from the room by said kiln ventilation system.

5. A kiln having a ventilation system as in claim 1 wherein at least one upper ventilation aperture means comprises a plurality of openings.

6. A kiln having a ventilation system as in claim 5 wherein said at least one lower ventilation aperture means comprises a plurality of openings.

7. A kiln having a ventilation system as in claim 5 wherein said plurality of openings are formed in said upper wall.

8. A kiln having a ventilation system as in claim 5 wherein said plurality of openings are formed in said side walls.

9. A kiln having a ventilation system as in claim 1 further comprising a plenum connecting said lower ventilation aperture means to said duct, said plenum having a room air inlet to permit room air to mix with the kiln gases in said plenum to cool the kiln gases and thus protect the materials used in said duct and said exhaust fan means.

10. A kiln having a ventilation system as in claim 9 further comprising a damper for opening and closing said room air inlet and a temperature control means for controlling the damper in response to temperature conditions within the plenum or within the firing chamber.

11. A kiln having a ventilation system as in claim 10 wherein said temperature control means is further coupled to said exhaust fan means to control the draw rate of said exhaust fan means in response to temperature conditions within the firing chamber or within the plenum.

12. In an electrically heated kiln having an upper wall, a lower wall and side walls forming a substantially fully enclosed firing chamber in which ceramic objects are placed; a ventilation system for oxidizing ceramic objects being fired in the firing chamber and for safely ventilating kiln gases produced during the firing process, while providing greater uniformity of temperature inside said firing chamber, said ventilation system comprising:
    at least one upper ventilation aperture means formed in the upper portion of said firing chamber through which incoming air may be drawn into said firing chamber;
    at least one lower ventilation aperture means formed in the lower portion of said firing chamber through which kiln gases may be expelled;
    a duct coupled between said lower ventilation aperture and the outside environment; and an exhaust fan means coupled to said duct for placing the firing chamber under negative pressure so that kiln gases produced within the kiln are prevented from escaping from said firing chamber through said upper aperture means into the room where the kiln is located, said fan means drawing air into said firing chamber through said upper aperture means and causing air and kiln gases to move downwardly through said firing chamber and outwardly through said lower ventilation aperture means into said duct, the downward movement of the air and kiln gases causing a more uniform temperature within said firing chamber;

said upper and lower aperture means being sized and the draw rate of said exhaust fan means being selected to limit the amount of air withdrawn at the bottom of the kiln so that less than 100% of the kiln volume is removed per minute when the kiln is operated at room temperature.

13. An electrically heated kiln having a ventilation system for oxidizing ceramic objects being fired in the interior of the kiln and for safely ventilating kiln gases produced during the firing process while providing greater uniformity in temperature inside the kiln, said kiln comprising:

an upper wall, a lower wall and side walls forming a substantially fully enclosed firing chamber in which ceramic objects are placed;

upper ventilation aperture means formed in the upper portion of said firing chamber through which incoming air may be drawn into the firing chamber and lower ventilation aperture means formed in the lower portion of said firing chamber through which kiln gases may be expelled for limiting the flow of air through the firing chamber so that less than 100% of the kiln volume is withdrawn at the lower portion of the kiln per minute when the kiln is operated at room temperature;

a duct coupled between said lower ventilation aperture means and the outside environment; and an exhaust fan means coupled to said duct for placing the firing chamber under negative pressure so that kiln gases produced within the kiln are prevented from escaping from said firing chamber through said upper aperture means into the room where the kiln is located, said fan means drawing air into said firing chamber through said upper aperture means and drawing air and kiln gases downwardly through said firing chamber and outwardly through said lower ventilation aperture means into said duct, the downward movement of the air and kiln gases causing turbulence near the upper portion of said firing chamber to create a more uniform temperature within said firing chamber.

* * * * *